United States Patent [19]

Hufman et al.

[11] Patent Number: 4,680,867

[45] Date of Patent: Jul. 21, 1987

[54] LEVEL WITH DUAL POINTERS

[76] Inventors: Marie C. Hufman; Norman C. Hufman, both of Rte. 1, Box 11, both of Blanca, Colo. 81123

[21] Appl. No.: 898,655

[22] Filed: Aug. 21, 1986

[51] Int. Cl.4 .............................................. G01C 9/12
[52] U.S. Cl. ..................................................... 33/391
[58] Field of Search .................................. 33/391, 366

[56] References Cited

U.S. PATENT DOCUMENTS

| 1,295,352 | 2/1919 | Mosher | 33/391 |
|---|---|---|---|
| 1,338,639 | 4/1920 | Lillberg | 33/391 |
| 1,468,688 | 9/1923 | Elliott | 33/391 |
| 1,618,262 | 2/1927 | Barger . | |
| 1,700,278 | 1/1929 | Barnett . | |
| 1,705,889 | 3/1929 | Bertram . | |
| 1,732,335 | 10/1929 | Iverson . | |
| 1,844,590 | 2/1932 | Morrison . | |
| 2,694,866 | 11/1954 | Hanauer | 33/391 |
| 2,956,346 | 10/1960 | White et al. | 33/391 |

Primary Examiner—William D. Martin, Jr.
Attorney, Agent, or Firm—Fields, Lewis, Pittenger & Rost

[57] ABSTRACT

A pointer-type level disclosed has a frame with a central transverse opening, a pair of depending pointers on the end of a shaft mounted on a single center bearing. A mounting assembly includes a pair of support disks for supporting the bearing and a pair of end caps that clamp the support disks to the sides of the frame.

10 Claims, 5 Drawing Figures

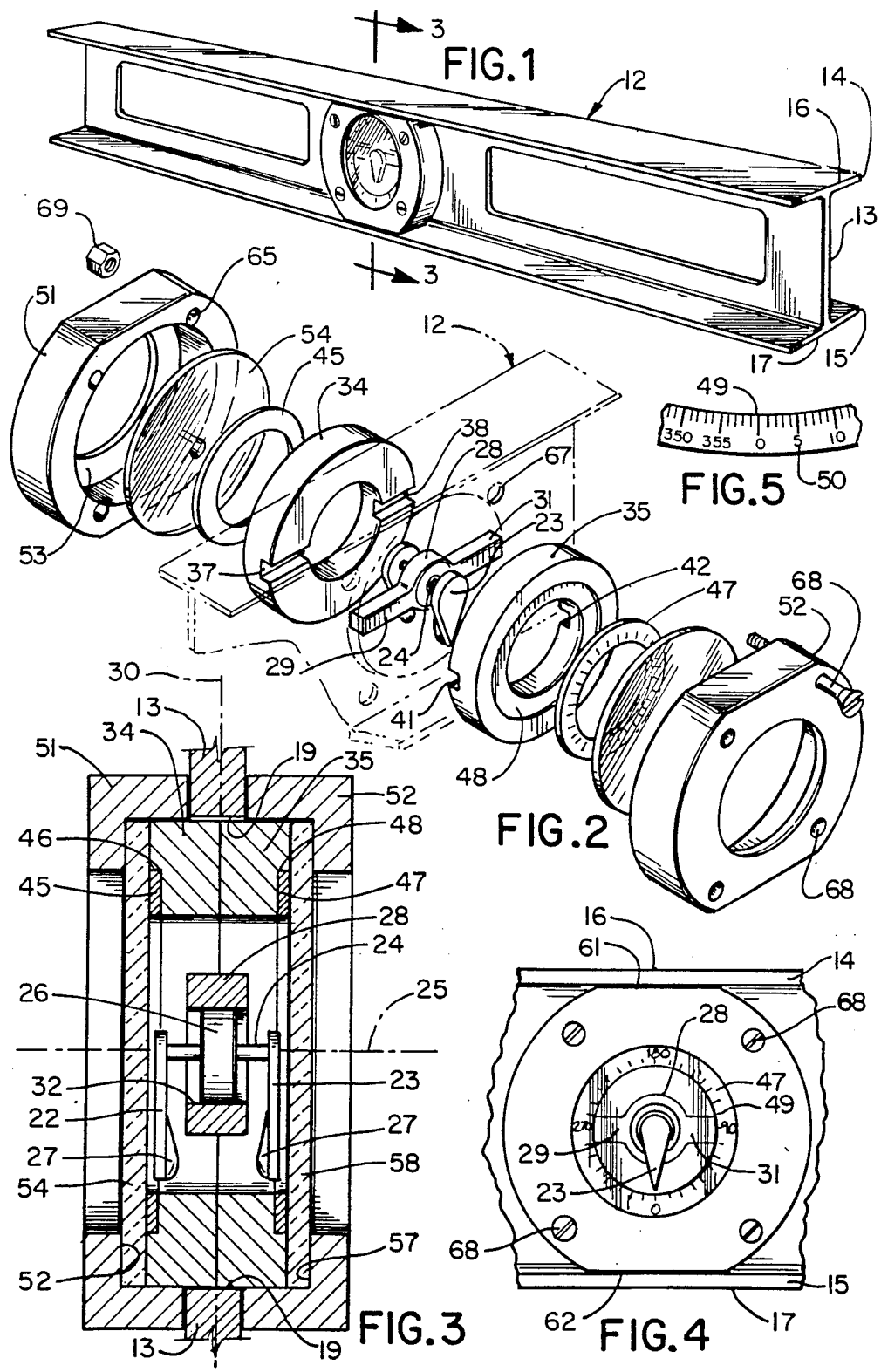

LEVEL WITH DUAL POINTERS

TECHNICAL FIELD

This invention relates to a novel and improved pointer-type level.

BACKGROUND ART

Levels having a bubble are sometimes difficult to read and can be broken when dropped. The bubble type level is not suitable for indicating precise amounts of deviation from the vertical or horizontal.

Barger U.S. Pat. No. 1,618,262, Barnett U.S. Pat. No. 1,700,278, and Iverson U.S. Pat. No. 1,732,335 disclose a pointer-type level wherein a transverse rotary shaft is mounted in two axially spaced bearings located at the ends of the shaft. This arrangement has problems with maintaining the shaft and pointers in alignment.

Bertram U.S. Pat. No. 1,705,889 and Morrison U.S. Pat. No. 1,844,590 disclose only a single pointer and single scale along one side of the frame.

DISCLOSURE OF INVENTION

A pointer-type level disclosed has a frame with a pair of depending pointers visible from opposite sides of the frame that are affixed to the ends of a transverse rotary shaft. A mounting assembly supporting the shaft for free rotation in a transverse central opening in the frame includes a single bearing centered between the pointers removably and adjustably clamped to the sides of the frame using a pair of oppositely disposed end caps. Each scale is on a disc that nests in the associated end cap to facilitate adjusting the scale circumferentially to a zero or other selected reading. A calibrated scale and numerical indicator for each pointer on opposite sides of the frame gives a visual indication of the precise angle of inclination of the frame when the frame is moved between horizontal and vertical positions.

BRIEF DESCRIPTION OF DRAWINGS

The details of the invention will be described in connection with the accompanying drawings, in which:

FIG. 1 is a perspective view of a pointertype level embodying features of the present invention.

FIG. 2 is an exploded view of the level of FIG. 1 with the frame shown in dashed lines.

FIG. 3 is a sectional view taken along lines 3—3 of FIG. 1.

FIG. 4 is a side elevation view of the central portion of the level shown in FIG. 1.

FIG. 5 is a fragmentary enlarged view of a calibrated scale showing one degree increments.

DETAILED DESCRIPTION

Referring now to the drawings there is shown a frame 12 having an I-shaped cross section with a central web portion 13 and an upper flange 14 and lower flange 15 arranged perpendicular to the web portion with the flanges having a straight top edge 16 with a straight bottom edge 17 parallel to and spaced from one another. A transverse opening 19 is formed in a central part of the web portion midway between the ends thereof.

A pair of depending pointers 22 and 23 are affixed to the ends of a transverse rotary shaft 24 arranged to rotate about an axis 25. Each pointer diverges toward an end point and has an added weight 27 spaced from the rotation axis adjacent the pointed end to enhance the returning of the pointer to a straight down or vertical orientation. The shaft 24 is also centered in relation to a vertical center line 30 of the web portion 13 so that it extends equal distances on each side of the vertical center line 30 along axis 25.

The shaft 24 is supported for rotation between its ends in the opening 19 in a center bearing 26. The center bearing in turn is mounted to the frame 12 by a mounting assembly which includes a generally circular central hub portion 28 with a circular central opening 32 centered on axis 25 into which the bearing 26 is press fitted and a pair of radial arm portions 29 and 31 which extend radially out in opposite directions from the hub portion 28. The radial arm portions mount to a pair of oppositely disposed circular support disks 34 and 35 which are coaxially aligned with axis 25. These disks have inner faces that butt against one another along vertical center line 30. Disk 34 has diametrically opposed slots 37 and 38 in the inner face of a depth to slidably receive half the thickness of the arm portions 29 and 31. In turn, disk 35 has diametrically opposed slots 41 and 42 in an inner face into which the other half thickness of the arm portion slides. In this way the support disks 34 and 35 have the shaft coaxially aligned and centered in relation to the center of the disks 34 and 35.

A scale ring 45 is mounted in a circular recess 46 in the outer face of disk 34. Similarly, a scale ring 47 is mounted in a circular recess 48 in the outer face of support disk 35. Each scale ring has circumferentially spaced calibration lines 49 shown in one degree increments in FIG. 5 which extend around its entire circumference to provide a calibrated scale to indicate the extent or amount of the angle of inclination of the associated pointer to the straight edges 16 and 17 when the frame is between horizontal and vertical positions. The calibration lines 49 are marked with numerical indicia 50 at five degree increments.

A pair of oppositely disposed coaxially aligned end caps 51 and 52 are mounted against the web portion on opposite sides of the opening 19. End cap 51 has a circular recess 53 in the inner face which slidably receives and in which there nests a circular lens 54 and a portion of support disk 34. Similarly, end cap 52 has a circular recess 57 in the inner face which slidably receives and in which there nests a lens 58 and a portion of disk 35. The end caps are generally circular and have a flat top edge 61 and a flat bottom edge 62 to slide fit between the top and bottom flanges 14 and 15.

As best seen in FIG. 3 the bearing, hub portion, pairs of pointers, pairs of disks, pairs of lenses and pairs of end caps are symmetrically arranged in relation to the vertical center line 30.

It is understood that the scale could be imprinted on the disk without using a separate scale ring element. The disk will rotate in the end cap when the nuts are unthreaded from the fastening bolts to enable the scale to be rotated so the pointer precisely aligns with a selected scale line such as 0 in the horizontal position for the frame which would enable the pointer to be pulled or zeroed in case it were displaced by dropping the frame or the like.

End cap 51 is provided with four circumferentially spaced holes 65 and end cap 52 is provided with four circumferentially spaced holes 66 which align with one another and with associated holes 67 in the web portion so that four threaded bolts 68 with nuts 69 will releasably fasten and more specifically clamp the end caps to the sides of the web portion.

From the foregoing it is apparent the level disclosed would be very durable, readable from either side of the frame and will indicate small angle increments as well as having the ability to zero or null the pointer in relation to the scale.

Although the present invention has been described with a certain degree of particularity, it is understood that the present disclosure has been made by way of example and that changes in details of structure may be made without departing from the spirit thereof.

What is claimed is:

1. A level comprising:
   a frame having spaced parallel straight edges and having a transverse opening between said edges,
   a pair of depending pointers on the ends of a transverse rotary shaft disposed in said opening,
   mounting means for supporting said shaft for free rotation in said opening, said mounting means including a central hub portion centered midway between said pointers supporting a single center bearing centered in said hub portion midway between said pointers, a pair of coaxial supports for said hub portion that separate along a parting line midway between said pointers and fastening means for releasably securing said supports to said frame with said supports extending out from opposite sides of said frame, and
   a calibrated scale for each pointer, said scales being disposed on opposite sides of said frame, each scale including calibration lines and numeral indicators to indicate the angle of inclination of the pointer to said straight edges when the frame is between horizontal and vertical positions.

2. A level as set forth in claim 1 where said frame is of a generally I-shaped cross section with a web portion and a pair of flanges perpendicular to the ends of the web portion, said opening being disposed in a central portion of said web portion.

3. A level as set forth in claim 1 wherein each pointer diverges from a central portion coaxially aligned with the axis of rotation of said shaft to a pointed end portion displaced a radial distance outwardly from said axis of rotation.

4. A level as set forth in claim 1 wherein each said pointer has an added weight between the axis of rotation and a pointed end.

5. A level comprising:
   a frame having spaced parallel straight edges and having a transverse opening between said edges,
   a pair of depending pointers on the ends of a transverse rotary shaft disposed in said opening,
   mounting means for supporting said shaft for free rotation in said opening, said mounting means including a center bearing disposed between said pointers, said mounting means including a central hub portion supporting said bearing and radial arm portions extending radially out in opposite directions from said hub portion, a pair of oppositely disposed coaxial support disks with a pair of diametrically opposed slots into which said arm portions slide fit, a pair of oppositely disposed coaxial end caps having recesses for receiving an associated support disk, and fastening means for securing said end caps on opposite sides of said frame, and
   a calibrated scale for each pointer, said scales being disposed on opposite sides of said frame, each scale including calibration lines and numeral indicators to indicate the angle of inclination of the pointer to said straight edges when the frame is between horizontal and vertical positions.

6. A level as set forth in claim 5 wherein said scales are disposed on an outer face of said support disks and said support disks are rotatable relative to said end caps to align said pointer with a selected line of said scale.

7. A level as set forth in claim 5 wherein said fastening means clamps said end caps against opposite sides of said frame.

8. A pointer-type level comprising:
   a frame having spaced parallel straight edges and having a transverse opening centrally disposed between said edges and the ends of said frame,
   a pair of depending pointers on the ends of a transverse rotary shaft disposed in said opening, each said pointer having an added weight between the axis of rotation and a pointed end,
   mounting means for supporting said shaft for free rotation in said opening, said mounting means including a center bearing disposed between said pointers, a central hub portion supporting said bearing and radial arm portions extending radially out in opposite directions from said hub portion, a pair of diametrically opposed slots into which said arm portions slide fit, a pair of oppositely disposed coaxial end caps having recesses for receiving an associated support disk, and fastening means for securing said end caps on opposite sides of said frame, and
   a calibrated scale for each pointer, said scales being disposed on an outer face of said support disks on opposite sides of said frame, each scale including calibration lines and numeral indicators to indicate the angle of inclination of the pointer to said straight edges when the frame is between horizontal and vertical positions.

9. A pointer-type level as set forth in claim 8 wherein said calibrated lines are in at least 5 degree increments.

10. A pointer-type level as set forth in claim 8 wherein said fastening means includes bolts extending through said end caps and said frame with nuts on the opposite ends to draw said end caps against the side of said frame.

* * * * *